(12) United States Patent
Schumann et al.

(10) Patent No.: US 9,360,008 B2
(45) Date of Patent: Jun. 7, 2016

(54) PISTON PUMP FOR DELIVERING A FLUID, AND ASSOCIATED BRAKE SYSTEM

(75) Inventors: Beate Schumann, Boennigheim (DE); Horst Beling, Heilbronn (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 12/681,733

(22) PCT Filed: Sep. 18, 2008

(86) PCT No.: PCT/EP2008/062453
§ 371 (c)(1),
(2), (4) Date: May 25, 2010

(87) PCT Pub. No.: WO2009/043733
PCT Pub. Date: Apr. 9, 2009

(65) Prior Publication Data
US 2010/0232994 A1   Sep. 16, 2010

(30) Foreign Application Priority Data
Oct. 4, 2007   (DE) .......................... 10 2007 047 417

(51) Int. Cl.
| | |
|---|---|
| F04B 53/10 | (2006.01) |
| F04B 53/12 | (2006.01) |
| F04B 53/14 | (2006.01) |
| F04B 1/04 | (2006.01) |
| B60T 8/40 | (2006.01) |

(52) U.S. Cl.
CPC ............. F04B 53/10 (2013.01); F04B 53/1007 (2013.01); F04B 53/125 (2013.01); F04B 53/143 (2013.01); B60T 8/4031 (2013.01); F04B 1/0452 (2013.01)

(58) Field of Classification Search
CPC ................ F04B 53/125–53/127; F04B 53/143
USPC ............. 417/554, 549, 437, 470, 569, 555.1, 417/454; 92/168
See application file for complete search history.

(56) References Cited

U.S. PATENT DOCUMENTS 6,457,956 B1 * 10/2002 Hauser et al. ................. 417/470
6,471,496 B1 * 10/2002 Merklein et al. ............. 417/569
(Continued)

FOREIGN PATENT DOCUMENTS

DE        19747850 A1    2/1999
WO    WO 2006013142 A1 *  2/2006    ............... F04B 1/04

*Primary Examiner* — Alexander Comley
(74) *Attorney, Agent, or Firm* — Maginot, Moore & Beck LLP

(57) ABSTRACT

A piston pump includes a piston assembly which has at least one transverse bore which corresponds to a longitudinal bore. The piston pump further includes a cylinder in which the piston assembly is guided in a longitudinally movable manner, and an inlet valve which includes a cage element, in which an inlet valve spring and sealing element are arranged, and a corresponding inlet valve seat which is arranged on the piston assembly. The inlet valve sealing element can be pressed sealingly into the corresponding inlet valve seat by means of a restoring spring in order to close off the longitudinal bore. The restoring spring is designed as a simple cylindrical spiral spring which is supported axially with an upper end winding against the cage element and with a lower end winding against a cylinder base. The cage element has an elastic high-pressure sealing element which, in the direction of a cylinder wall, has a radial support region for holding and centering the upper end winding of the restoring spring. In order to guide the restoring spring, the cylinder has, at the transition between the cylinder wall and the cylinder base, a cylinder base corner radius which is adapted to the lower end winding.

20 Claims, 5 Drawing Sheets

(56) References Cited

U.S. PATENT DOCUMENTS

| | | | |
|---|---|---|---|
| 6,514,055 B1 * | 2/2003 | Schuller | 417/460 |
| 6,514,056 B1 * | 2/2003 | Schuller et al. | 417/549 |
| 2001/0002978 A1 * | 6/2001 | Siegel et al. | 417/470 |
| 2008/0307955 A1 * | 12/2008 | Schepp et al. | 92/132 |

* cited by examiner

PISTON PUMP FOR DELIVERING A FLUID, AND ASSOCIATED BRAKE SYSTEM

CROSS-REFERENCE TO RELATED APPLICATION

This application is a 35 USC 371 application of PCT/EP2008/062453 filed on Sep. 18, 2008.

BACKGROUND OF THE INVENTION

1. Field of the Invention

The invention is based on a piston pump for delivering a fluid, which is used in particular in vehicle brake systems.

2. Description of the Prior Art

In vehicles with hydraulic or electrohydraulic vehicle brake systems, such piston pumps are preferably used as return feed pumps, for selectively lowering or raising a brake pressure in the wheel brake cylinders, and as a result the brake pressure in the wheel brake cylinders can be regulated. Such regulation can be performed for instance in an anti-lock brake system (ABS), a traction control system (TC system), and an electronic stability program, and so forth. FIGS. 1 through 3 show a conventional piston pump that is used in a vehicle brake system. As can be seen from FIGS. 1 through 3, a conventional piston pump has a piston assembly 2, which has a first piston element 2.1, with a sealing element 13, and a second piston element 2.2, an inlet valve 5, an outlet valve 6, and a cylinder 8. The inlet valve 5 is embodied as a check valve and includes a cage element 11, in which an inlet valve spring 5.2 and an inlet valve sealing element 5.3 are disposed, and the inlet valve sealing element 5.3 is embodied for instance as a sealing disk, which can cooperate sealingly with a corresponding inlet valve seat 5.1 that is disposed on the second piston element 2.2, and the second piston element 2.2 is connected by nonpositive engagement to the cage element 11. The outlet valve 6 is likewise embodied as a spring-loaded check valve and is disposed in a cap element 12. The outlet valve 6 is opened when a pressure in a compression chamber 8A is greater than a spring force, acting on an outlet valve sealing element 6.2 of the outlet valve 6 of an outlet valve spring 6.3, as a result of which the outlet valve sealing element 6.2 is pressed out of an outlet valve seat 6.1 disposed at an outlet opening 8.3 of the cylinder 8.

During an intake stroke of the piston assembly 2, fluid is aspirated radially via a filter sleeve 9 and via transverse bores 3 that are disposed in the first piston element 2.1, and the fluid is carried via the longitudinal bore 4 corresponding with the transverse bores 3 in the second piston element 2.2 and via the opened inlet valve 5 into the compression chamber 8.1, which is disposed in the cylinder 8 between the inlet valve 5 and the outlet valve 6. After top dead center is reached, the direction of motion of the piston group 2 is reversed, so that the second piston element 2.2 with the inlet valve seat 5.1 is pressed sealingly onto the inlet valve sealing element 5.3, via the first piston element 2.1 driven by an eccentric element 14 disposed in an eccentric chamber 15, and the inlet valve 5 is closed. In the compression chamber 8.1, a pressure buildup now takes place until such time as the pressure in the compression chamber 8.1 is greater than the spring force of the outlet valve 6, as a result of which the fluid under pressure is conducted out of the compression chamber 8.1 into an outlet line, not shown, via the outlet opening 8.3 and the open outlet valve 6.

After bottom dead center is reached, the direction of motion of the piston group 2 reverses again, so that the outlet valve 6 closes again, and the intake stroke begins again; a restoring force F2 of a restoring spring 10, disposed in the compression chamber 8.1 and guided by a cylinder wall 8.4, which spring is embodied for instance as a spiral spring with polished end windings and is braced on a cylinder bottom 8.2 and on the cage element 11, acts against the cage element 11 of the inlet valve 5 and thus against the second piston element 2.2, in order to move the piston assembly 2 back in the direction of top dead center. During operation, axial forces F1 and F2, which on the one hand are effected by the eccentric element 14 and introduced via the first piston element 2.1, and on the other are effected by the restoring spring 10 and introduced via the cage element 11, and radial forces F3, which are generated by the prevailing system pressure, therefore act on the second piston element 2.2, which has the inlet valve seat 5.1.

ADVANTAGES AND SUMMARY OF THE INVENTION

The piston pump of the invention has the advantage over the prior art that a restoring spring is embodied as a simple cylindrical spiral spring, that is, without polished end windings. The restoring spring embodied as a spiral spring is braced axially with an upper end winding on a cage element and with a lower end winding on a cylinder bottom; the cage element has an elastic high-pressure sealing element, which toward one cylinder wall has a radial contact region for receiving and centering the upper end winding of the restoring spring, and the cylinder in which the restoring spring is disposed has a cylinder bottom corner radius, adapted to the lower end winding, and a transition between the cylinder wall and the cylinder bottom, for guiding the restoring spring. As a result of the embodiment without polished end windings, the restoring spring embodied as a spiral spring can be produced economically. In addition, the notch stress can be reduced by means of the cylinder bottom corner radius, and as a result the cylinder bottom can be made extremely thin, so that the component length can advantageously be reduced. The cylinder bottom corner radius corresponds for instance to a radius of the spring wire of the restoring spring. The piston pump of the invention can be used in particular as a return feed pump in a brake system for a vehicle.

It is especially advantageous that the radial contact region for the upper winding end of the restoring spring embodied as a spiral spring is embodied as a radial receiving groove, as a result of which the restoring spring embodied as a spiral spring can be guided in centered fashion even without polished winding ends. Moreover, the radial receiving groove can be shaped on its outer edge as a flexible sealing lip, which closes off the compression chamber in pressure-tight fashion toward the cylinder wall, and the sealing lip can provide sealing in the load situation with pressures up to 100 bar. By the combination of the radial receiving groove and the sealing lip, the high-pressure sealing element is advantageously quite short. Moreover, the elastic high-pressure sealing element is embodied for absorbing radially acting force components and for sealing off the compression chamber from the cylinder wall via a radial sealing face at elevated pressures, for instance up to 500 bar; the radial sealing face is shaped by means of a pressure-caused widening of the high-pressure sealing element, and the sealing function is then ensured by the total radial outer diameter of the high-pressure sealing element. Furthermore, the high-pressure sealing element provides axial sealing off from a piston assembly via an axial sealing face, and the piston assembly is returned to an outset position by the restoring spring via the high-pressure sealing element. At elevated pressures, the high-pressure sealing element is reinforced by the stiff cylinder wall and the stiff valve seat, both of which are made from a wear-resistant material. Accordingly, the high-pressure sealing element has to absorb only slight differential pressure forces and thus experiences only slight elongation.

In a feature of the piston pump of the invention, the piston assembly includes a first piston element and a second piston element, and an inlet valve seat comprises a wear-resistant material and is disposed on the second piston element, which absorbs axially acting force components. At least one transverse bore corresponding to a longitudinal bore is made in the second piston element, and the elastic high-pressure sealing element seals off axially against the second piston element via the axial sealing face. Since the high-pressure sealing element absorbs the radially acting force components, the piston assembly coupled with the high-pressure sealing element now needs to absorb only the operative axial forces and experiences no further deformation from additional radial forces. This dividing up of the axial and radial force components each to one component advantageously leads to a reduction in component loads with respect to elongation and stress and makes it possible to embody the components with a lower component strength. From the reduction in tension, the at least one intake bore embodied as a transverse bore and the corresponding longitudinal bore can be placed in the second piston element, and the cage element with the elastic high-pressure sealing element and the second piston element with the inlet valve seat can be made as plastic injection-molded parts. Embodying them as plastic injection-molded parts advantageously enables simple, economical production of the components, and complex shaping is possible. Overall, the piston pump of the invention makes an extreme reduction in the cost for the piston assembly possible and makes assembly easy. Moreover, the piston pump of the invention provides improved intake performance, greater pressure resistance, and an extremely short inlet region.

In a further feature of the piston pump of the invention, the first piston element is embodied for instance as a cylindrical needle roll and is advantageously available as a mass-produced standard part. Since the transmission of the driving force of an eccentric element is effected via a linear contact on the first piston element, embodied as a solid metal needle roll, preferably as a steel needle roll, wear can advantageously be reduced.

Advantageous embodiments of the invention, described below, and the conventional exemplary embodiments, described above for the sake of better comprehension of the invention, are shown in the drawings. In the drawings, identical reference numerals designate components and elements that perform the same or analogous functions.

BRIEF DESCRIPTION OF THE DRAWINGS

The invention is described in further detail below in conjunction with the accompanying drawings, in which.

DESCRIPTION OF THE PREFERRED EMBODIMENTS

Figure 1:
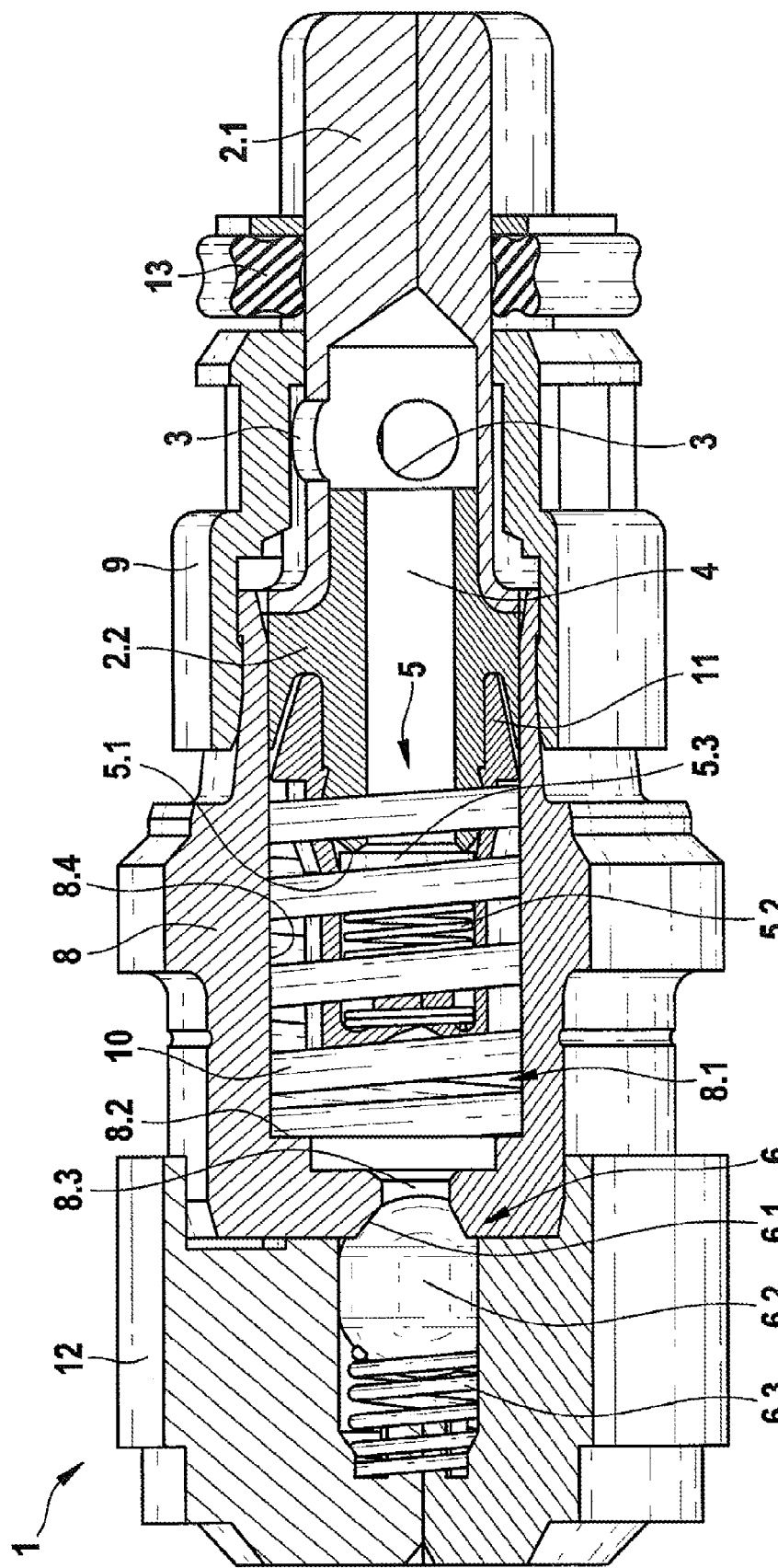
FIG. 1 shows a schematic perspective view of a conventional piston pump.
Figure 2:
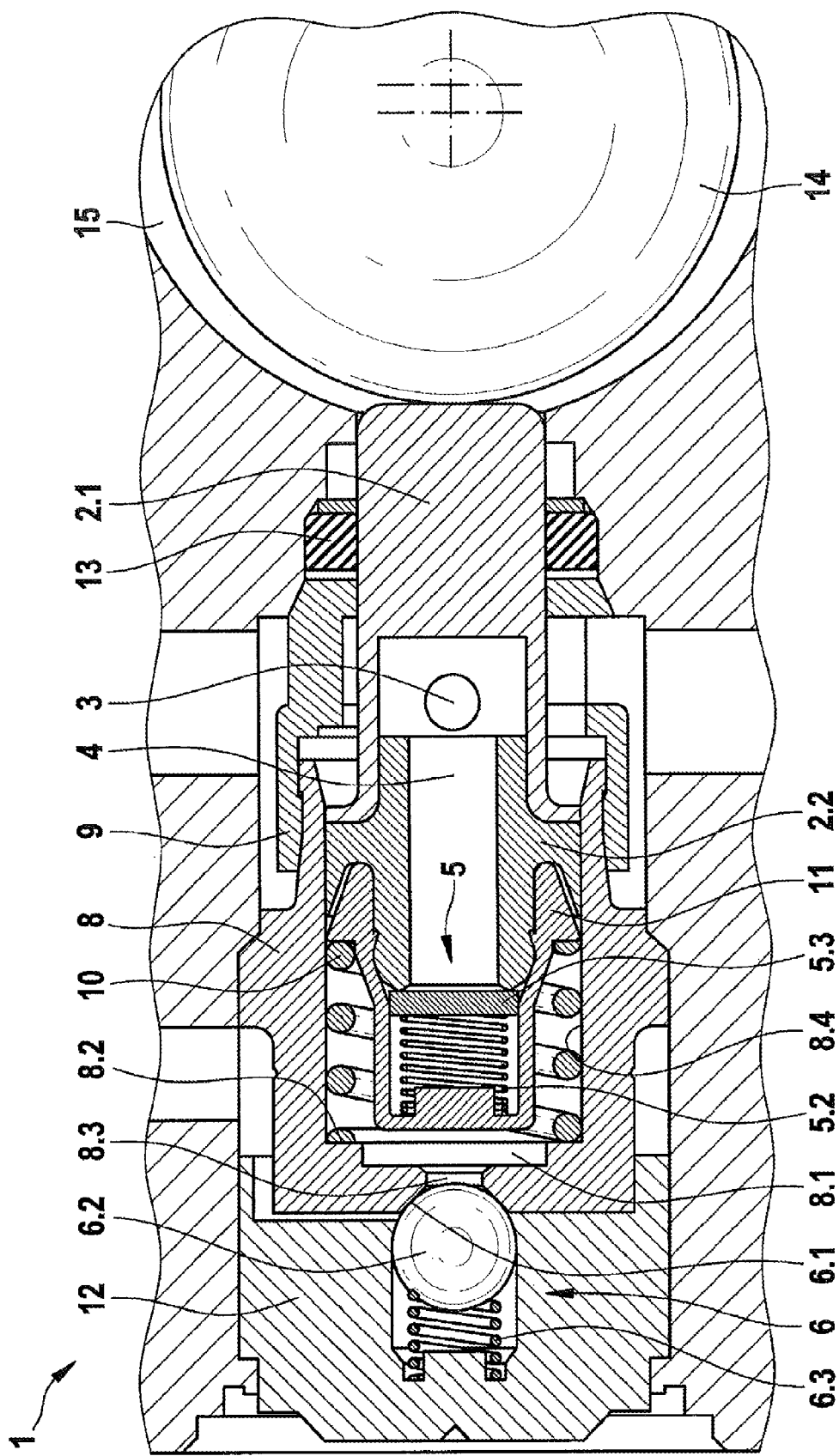
FIG. 2 shows a schematic sectional view of a conventional piston pump.
Figure 3:
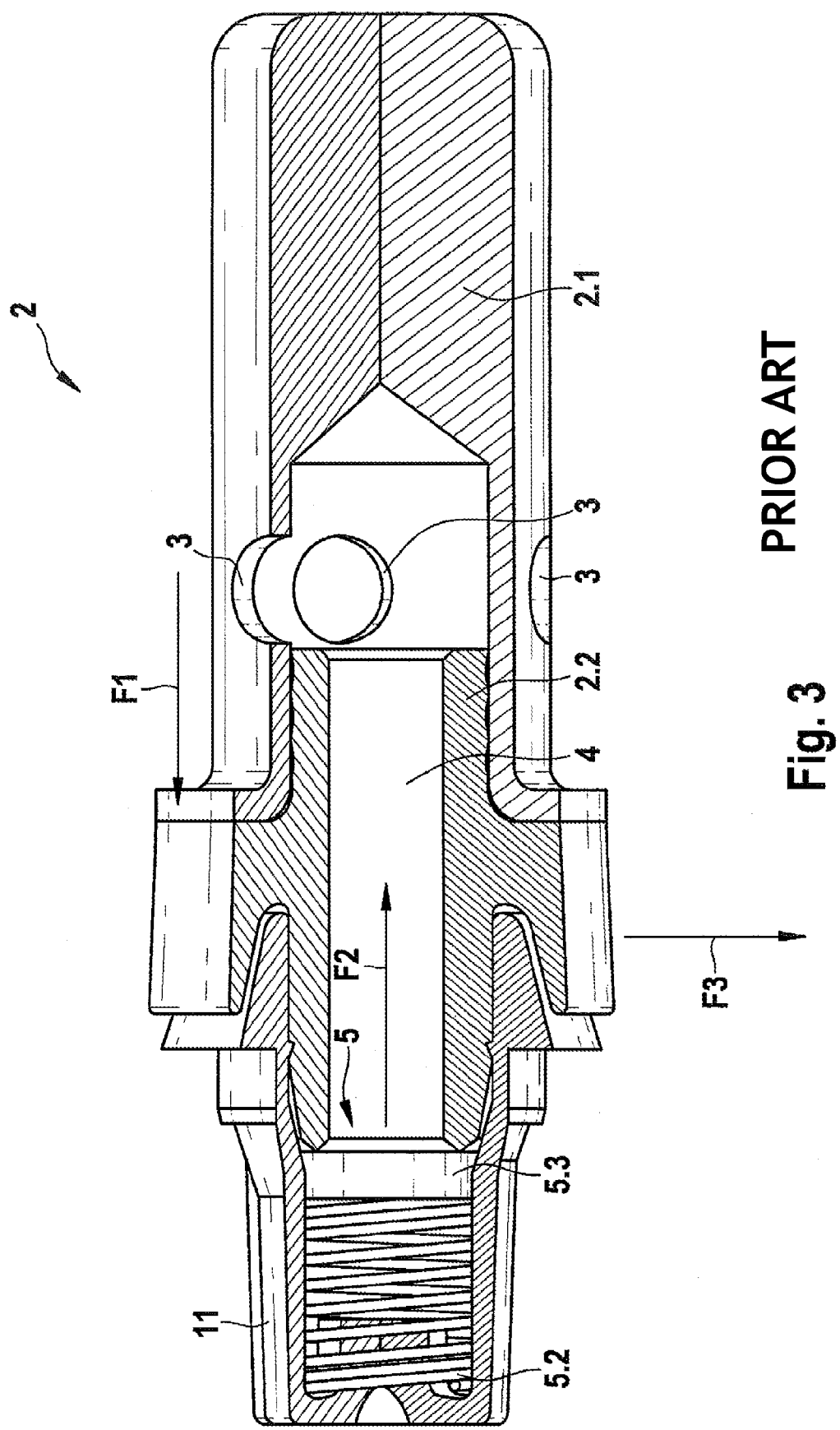
FIG. 3 shows a schematic perspective view of the components of an inlet valve for the conventional piston pump of FIG. 1 or FIG. 2.

A piston pump according to the invention, which can be used as a return feed pump in a vehicle brake system, essentially includes the same components as the conventional piston pump 1 described in conjunction with FIGS. 1 through 3. To avoid text repetition, only the essential differences between the piston pump of the invention and the conventional piston pump 1 of FIGS. 1 through 3 will be described in detail here. In a distinction from the conventional piston pump 1 of FIGS. 1 through 3, the piston pump of the invention includes an improved restoring spring in combination with a high-pressure sealing element.

Figure 4:
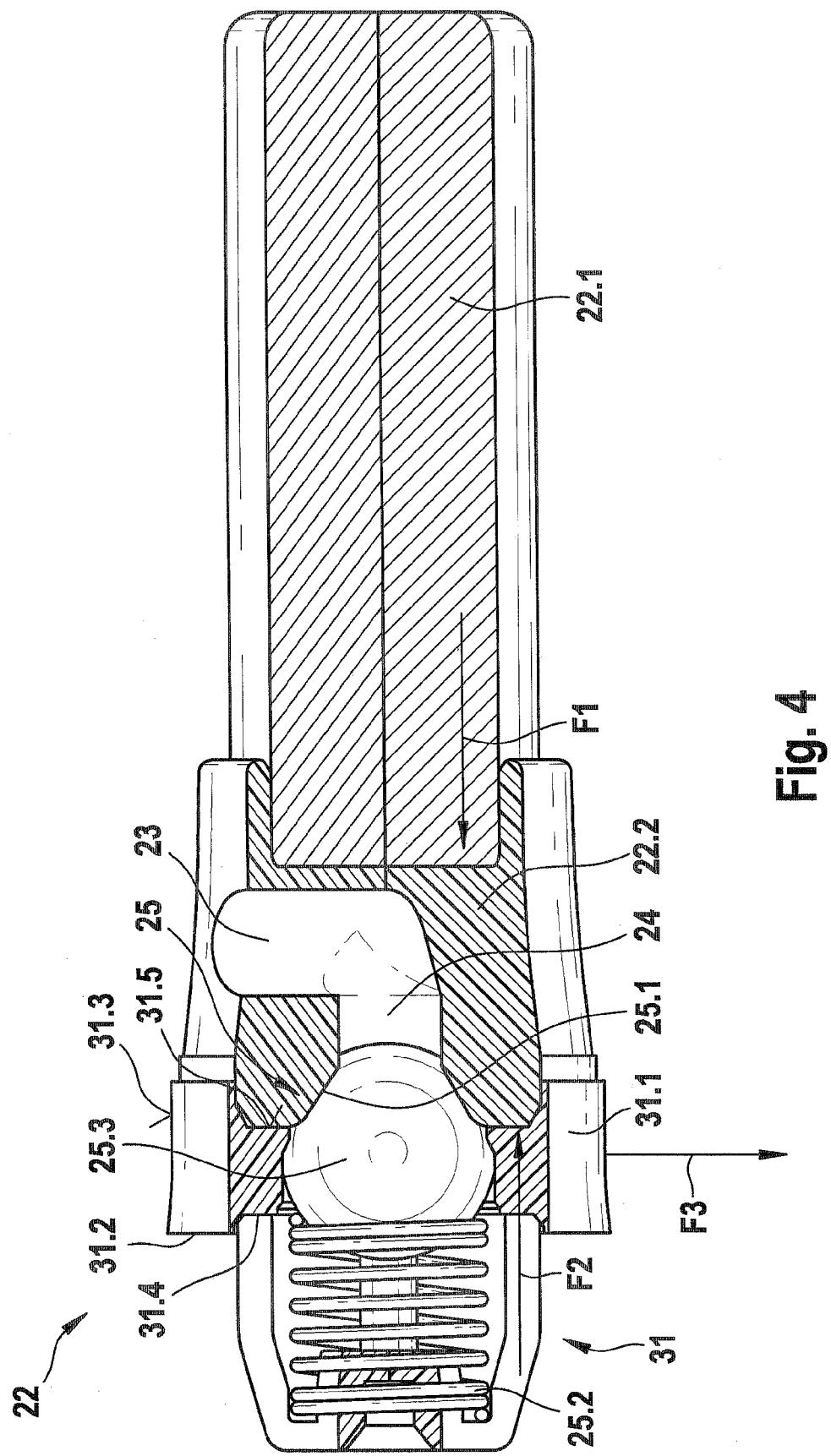
FIG. 4 shows a schematic perspective view of the components of an inlet valve for a piston pump according to the invention.

As can be seen from FIG. 4, the inlet valve 25 of the piston pump of the invention, analogously to the conventional piston pump 1, has a cage element 31, in which an inlet valve spring 25.2 and an inlet valve sealing element 25.3, which is embodied for instance as a sealing ball, are disposed, and also has a corresponding inlet valve seat 25.1, which is disposed on a second piston element 22.2 of a piston assembly 22; the inlet valve sealing element 25.3 can be pressed sealingly into the corresponding inlet valve seat 25.1 by a spring force of the inlet valve spring 25.2. The piston assembly 22 includes a first piston element 22.1, which is embodied here as a cylindrical needle roll, for example, and the second piston element 22.2; the inlet valve seat 25.1 comprises a wear-resistant or hard material. In a distinction from the conventional piston pump 1, the cage element 31 of the piston pump of the invention has an elastic high-pressure sealing element 31.1, which is embodied for absorbing radially acting force components F3 and for sealing off against a cylinder wall 28.4 shown in FIG. 5, at pressures up to 100 bar via a radial sealing lip 31.2 and at higher pressures via an additional radial sealing face 31.3, and, via an axial sealing face 31.5, for sealing off axially against the piston assembly 22, or in other words against the second piston element 22.2, which rests on the axial sealing face 31.5.

In a distinction from the conventional piston pump 1, the second piston element 22.2 now absorbs only the axially acting force components F1 and F2, so that a longitudinal bore 24 and transverse bores 23 that correspond to the longitudinal bore 24 can be made in the second piston element 22.2. In the exemplary embodiment shown, the cage element 31 is embodied with the elastic high-pressure sealing element 31.1, and the second piston element 22.2 and the inlet valve seat 25.1 are both embodied as plastic injection-molded parts, thus advantageously making simple, economical production of the components possible, and complex shaping is also possible. Moreover, the first piston element 22.1, in the exemplary embodiment shown, is solidly coupled to the second piston element 22.2. In an embodiment not shown, the first piston element 22.1 can be loosely coupled to the second piston element 22.2. Overall, the embodiment of the inlet valve 25 according to the invention, in combination with the piston assembly 22, makes an extreme cost reduction for the piston pump possible along with simple assembly. Furthermore, the piston pump of the invention makes improved intake performance, greater pressure resistance, and an extremely short inlet region available.

Figure 5:
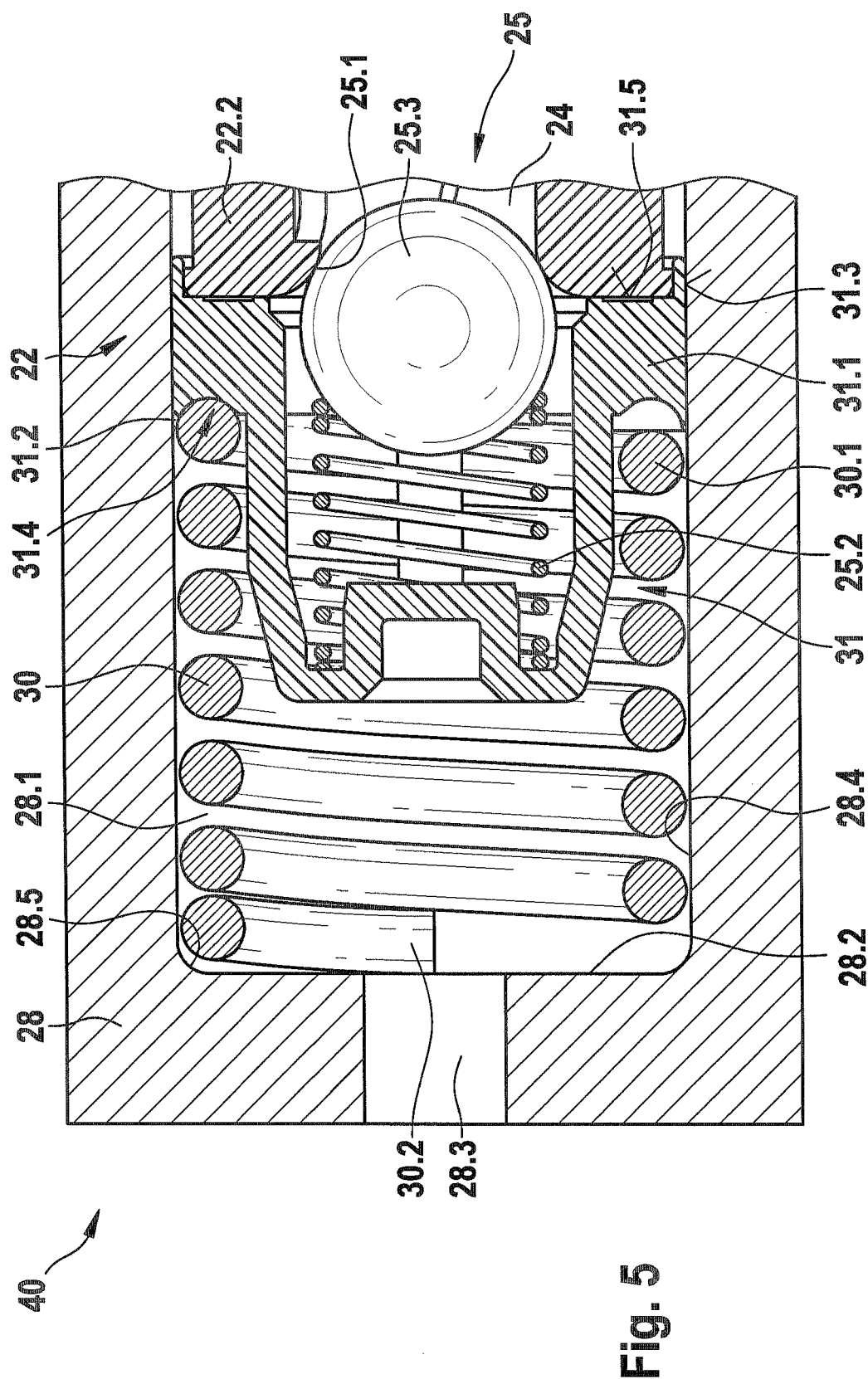
FIG. 5 shows a schematic sectional view of a compression region of a piston pump according to the invention.

As can be seen from FIG. 5, the piston assembly 22 with the inlet valve 25 is guided longitudinally movably in a cylinder 28 of a compression region 40, and during an intake stroke of the piston assembly 22, fluid is radially aspirated through the transverse bores 23 in the second piston element 22.2 and carried into a compression chamber 28.1 through the open inlet valve 25, via the longitudinal bore 24 that corresponds with the transverse bores 23. After reaching top dead center, the direction of motion of the piston assembly 22 is reversed, so that the second piston element 22.2 with the inlet valve seat 25.1 is pressed sealingly against the inlet valve sealing element 25.3, via the first piston element 22.1 driven by an eccentric element, not shown, and the inlet valve 25 is closed. Now a pressure buildup takes place in the compression chamber 28.1, until such time as the pressure in the compression chamber 28.1 is greater than the spring force of an outlet valve, not shown, as a result of which the fluid under pressure is conducted via an outlet opening 28.3 and the open outlet valve out of the compression chamber 28.1 into an outlet line, not shown.

After bottom dead center is reached, the direction of motion of the piston assembly 22 is reversed again, so that the outlet valve closes again, and the intake stroke begins again, and a restoring force of a restoring spring 30, disposed in the compression chamber 28.1 and embodied as a simple spiral spring without polished winding ends, has an axially acting force component F2 which presses against a radial receiving region 31.4 that is disposed on the high-pressure sealing element 31.1. The restoring force component F2 is axially against the second piston element 22.2 via the high-pressure sealing element 31.1 and the axial sealing face 31.5, and as a result the piston assembly 22 is moved back in the direction of top dead center. The radial receiving region 31.4, for instance in the form of a radial receiving groove, is embodied for receiving and centering an upper end winding 30.1 of the restoring spring, and the restoring spring 30 embodied as a spiral spring is braced in this receiving groove with its upper end winding 30.1. By the combination of the radial receiving groove 31.4 and the sealing lip 31.2, the high-pressure sealing element 31.1 is advantageously quite short in the axial direction. Via a lower end winding 30.2, the restoring spring 30 is braced on a cylinder bottom 28.2. At the transition between the cylinder wall 28.4 and the cylinder bottom 28.2, for guiding the restoring spring 30, the cylinder 28 has a cylinder bottom corner radius 28.5 that is adapted to the lower end winding 30.2. The cylinder bottom corner radius 28.5 preferably corresponds to a radius of the spring wire of the restoring spring 30. As a result of the embodiment without polished end windings, the restoring spring 30 embodied as a spiral spring can be produced economically. Moreover, by means of the cylinder bottom corner radius 28.5, the notch stress can be reduced, as a result of which the cylinder bottom 28.2 can be embodied as quite thin, and the component length can advantageously be reduced.

As can also be seen from FIG. 5, the radial receiving region 31.4 is shaped on the outer edge as a flexible sealing lip 31.2, which closes off the compression chamber 28.1 toward the cylinder wall 28.4 in pressure-tight fashion. Since the elastic high-pressure sealing element 31.1 is disposed between the metal restoring spring 30 and the second piston element 22.2 that is made from a wear-resistant and thus harder material, the radial sealing face 31.3 is widened as a result of pressure, so that the high-pressure sealing element 31.1 rests sealingly with its full radial outer diameter on the cylinder wall 28.4. During the compression of the fluid aspirated into the compression chamber 28.1, the high-pressure sealing element 31.1 seals off radially against the cylinder wall 28.4 via the radial sealing face 31.3 and against the second piston element 22.2 by means of the axial sealing face 31.5. In addition, the inlet valve sealing element 25.3 seals off axially against the inlet valve seat 25.1 in the first piston element 22.2.

In the piston pump of the invention, the component sizes of the high-pressure sealing element and of the cylinder are advantageously reduced. Because of the embodiment without polished end windings, the restoring spring embodied as a spiral spring can be produced economically. Overall, the invention makes an economical and space-optimized piston pump possible, with components that are simple to produce and are embodied for instance as plastic injection-molded parts, and the high-pressure sealing element with reinforcement by surrounding components is high-pressure-proof up to 500 bar, and the sealing function in the low-pressure range below 100 bar is embodied by means of the sealing lip on the high-pressure sealing element.

The foregoing relates to the preferred exemplary embodiments of the invention, it being understood that other variants and embodiments thereof are possible within the spirit and scope of the invention, the latter being defined by the appended claims.

The invention claimed is:

1. A piston pump comprising:
   a piston assembly including (i) a first piston element embodied as a solid cylindrical needle roll having a constant outer diameter and in which no bores are defined, and (ii) a second piston element surrounding a portion of the first piston element and defining at least one transverse bore and a longitudinal bore, the at least one transverse bore discharging into the longitudinal bore;
   a cylinder in which the piston assembly is guided longitudinally movably; and
   an inlet valve including (i) a cage element, in which one inlet valve spring and an inlet valve sealing element are disposed, and (ii) a corresponding inlet valve seat defined on the piston assembly,
   wherein a spring force of the inlet valve spring presses the inlet valve sealing element sealingly into the corresponding inlet valve seat to close the longitudinal bore, and via the at least one transverse bore in the piston assembly, fluid is aspirated through the longitudinal bore via the inlet valve into a compression chamber of the cylinder, in which a restoring spring for the piston assembly is disposed,
   wherein the restoring spring includes a simple cylindrical spiral spring defining a spring wire radius, the cylindrical spiral spring being braced axially with an upper end winding on the cage element and with a lower end winding on a cylinder bottom,
   wherein the cage element has an elastic high-pressure sealing element which extends toward a cylinder wall, the elastic high pressure sealing element having a radial receiving region that defines a radial receiving groove structure for receiving and centering the upper end winding of the restoring spring,
   wherein the cylinder has a transitional corner between the cylinder wall and the cylinder bottom that is defined by a cylinder bottom corner radius that is substantially equal to the spring wire radius such that the lower end winding is at least partially encompassed by the transitional corner in a complementary fashion, and
   wherein the radial receiving groove structure has a curved surface for receiving the upper end winding of the cylindrical spiral spring, the curved surface having a radius that is substantially equal to the spring wire radius so that the upper end winding is received into the radial receiving groove structure in a complementary fashion.

2. The piston pump as defined by claim 1, wherein the radial receiving groove structure has an outer edge which defines a flexible sealing lip that closes off the compression chamber in pressure-tight fashion toward the cylinder wall.

3. The piston pump as defined by claim 1, wherein:
the elastic high-pressure sealing element further comprises a radial sealing face configured to absorb radially acting force components and to seal off the compression chamber from the cylinder wall, and
the radial sealing face is shaped by a pressure-caused widening of the high-pressure sealing element.

4. The piston pump as defined by claim 2, wherein:
the elastic high-pressure sealing element further comprises a radial sealing face configured to absorb radially acting force components and to seal off the compression chamber from the cylinder wall, and
the radial sealing face is shaped by a pressure-caused widening of the high-pressure sealing element.

5. The piston pump as defined by claim 1, wherein the elastic high-pressure sealing element further comprises a radial sealing face that axially seals off the elastic high-pressure sealing element from the piston assembly.

6. The piston pump as defined by claim 2, wherein the elastic high-pressure sealing element further comprises a radial sealing face that axially seals off the elastic high-pressure sealing element from the piston assembly.

7. The piston pump as defined by claim 1, wherein:
the inlet valve seat comprises a wear-resistant material and is defined on the second piston element,
the second piston element is configured to absorb axially acting force components, and
the elastic high-pressure sealing element seals off axially from the second piston element via a radial sealing face.

8. The piston pump as defined by claim 6, wherein:
the inlet valve seat comprises a wear-resistant material and is defined on the second piston element,
the second piston element is configured to absorb axially acting force components, and
the elastic high-pressure sealing element seals off axially from the second piston element via the radial sealing face.

9. The piston pump as defined by claim 7, wherein the cage element having the elastic high-pressure sealing element and the second piston element are both embodied as plastic injection-molded parts.

10. A brake system for a vehicle, including a return feed pump, which is embodied as a piston pump as defined by claim 1.

11. A brake system for a vehicle, including a return feed pump, which is embodied as a piston pump as defined by claim 8.

12. The piston pump as defined by claim 3, wherein the radial sealing face axially seals off the elastic high-pressure sealing element from the piston assembly.

13. The piston pump as defined by claim 2, wherein:
the inlet valve seat comprises a wear-resistant material and is defined on the second piston element,
the second piston element is configured to absorb axially acting force components, and
the elastic high-pressure sealing element seals off axially from the second piston element via the radial sealing face.

14. The piston pump as defined by claim 3, wherein: the inlet valve seat comprises a wear-resistant material and is defined on the second piston element, the second piston element is configured to absorb axially acting force components, and the elastic high-pressure sealing element seals off axially from the second piston element via the radial sealing face.

15. The piston pump as defined by claim 8, wherein the cage element having the elastic high-pressure sealing element and the second piston element are both embodied as plastic injection-molded parts.

16. The piston pump as defined by claim 1, wherein the cage element further includes a cage projection extending from the elastic high-pressure sealing element, and the upper end winding of the cylindrical spiral spring is located in the radial receiving groove structure such that no portion of the cylindrical spiral spring contacts the cage projection.

17. The piston pump as defined by claim 16, wherein the cage projection defines a spring space, and the inlet valve spring is positioned in the spring space.

18. A piston pump comprising:
a piston assembly including at least one transverse bore and a longitudinal bore corresponding with the at least one transverse bore;
a cylinder in which the piston assembly is guided longitudinally movably; and
an inlet valve including (i) a cage element, in which one inlet valve spring and an inlet valve sealing element are disposed, and (ii) a corresponding inlet valve seat defined on the piston assembly,
wherein a spring force of the inlet valve spring presses the inlet valve sealing element sealingly into the corresponding inlet valve seat to close the longitudinal bore, and via the at least one transverse bore in the piston assembly, fluid is aspirated through the longitudinal bore via the inlet valve into a compression chamber of the cylinder, in which a restoring spring for the piston assembly is disposed,
wherein the restoring spring is braced axially with an upper end winding on the cage element and with a lower end winding on a cylinder bottom,
wherein the cage element has an elastic high-pressure sealing element which extends toward a cylinder wall, the elastic high pressure sealing element having a radial receiving region that defines a radial receiving groove structure for receiving and centering the upper end winding of the restoring spring,
wherein the radial receiving groove structure has a curved surface for receiving the upper end winding of the restoring spring, the curved surface having a radius that is substantially equal to a spring wire radius so that the upper end winding is received into the radial receiving groove structure in a complementary fashion,
wherein the elastic high-pressure sealing element includes an axial sealing face, against which an end surface of the piston assembly rests, and an annular projecting structure extending from the axial sealing face and surrounding an end portion of the piston assembly, the annular projecting structure having an outer circumferential face in sealing contact with the cylinder wall and an inner circumferential face in sealing contact with an outer circumferential surface of the piston assembly such that the annular projecting structure forms a seal between the piston assembly and the elastic high-pressure sealing element and absorbs radially acting force components therebetween, and
wherein no portion of the piston assembly contacts the cylinder wall.

19. The piston pump as defined by claim 18, wherein the piston assembly includes (i) a first piston element embodied as a solid cylindrical needle roll having a constant outer diameter and in which no bores are defined and (ii) a second piston element surrounding a portion of the first piston element and defining the at least one transverse bore and the longitudinal bore.

20. The piston pump as defined by claim 18, wherein an axial position of the annular projecting structure corresponds to an axial position of the inlet valve seat.

* * * * *